United States Patent
Panicker et al.

(10) Patent No.: US 7,805,511 B1
(45) Date of Patent: Sep. 28, 2010

(54) AUTOMATED MONITORING AND REPORTING OF HEALTH ISSUES FOR A VIRTUAL SERVER

(75) Inventors: Shubhashri Panicker, Cranberry Township, PA (US); Anton W. Knaus, Peters Township, PA (US)

(73) Assignee: NetApp, Inc., Sunnyvale, CA (US)

( * ) Notice: Subject to any disclaimer, the term of this patent is extended or adjusted under 35 U.S.C. 154(b) by 184 days.

(21) Appl. No.: 12/112,902

(22) Filed: Apr. 30, 2008

(51) Int. Cl.
    *G06F 15/173* (2006.01)
(52) U.S. Cl. .................. 709/224; 709/223; 370/242
(58) Field of Classification Search .............. 709/223, 709/224; 714/15, 25; 718/1; 370/242
See application file for complete search history.

(56) References Cited

U.S. PATENT DOCUMENTS

| | | | |
|---|---|---|---|
| 6,691,250 B1 * | 2/2004 | Chandiramani et al. | 714/25 |
| 6,760,862 B1 * | 7/2004 | Schreiber et al. | 714/15 |
| 2004/0117369 A1 * | 6/2004 | Mandal et al. | 707/8 |
| 2005/0240558 A1 * | 10/2005 | Gil et al. | 707/1 |
| 2006/0005048 A1 * | 1/2006 | Osaki et al. | 713/193 |
| 2007/0028239 A1 * | 2/2007 | Dyck et al. | 718/1 |
| 2007/0043860 A1 * | 2/2007 | Pabari | 709/224 |
| 2008/0301382 A1 * | 12/2008 | Miki et al. | 711/154 |

* cited by examiner

*Primary Examiner*—Frantz B Jean
(74) *Attorney, Agent, or Firm*—Slattler-Suh PC

(57) ABSTRACT

Method and apparatus for automated monitoring and reporting of health issues for a virtual server is described herein. A virtual server may comprise virtual-server components distributed over two or more server systems, the components being used collectively to provide data-access service to client systems. A virtual server may further comprise virtual-server components that are distributed over one or more storage systems. Each server system of a virtual server may implement a health module that automatically monitors and reports health issues regarding the functions/operations or performance of the virtual server. In some embodiments, the health modules executing on the server systems work in conjunction to monitor and report on the virtual-server components (comprising physical and/or virtual components) of the virtual server. As such, the health modules provide convenient and automated monitoring and reporting of health issues affecting the virtual server in providing data-access service to a set of client systems.

19 Claims, 12 Drawing Sheets

| Health Issue | Status | Health Flag |
|---|---|---|
| nfslisteners.failure | | critical |
| nfsserveradd.failure | | warning |
| nfsservermodify.failure | | informational |
| nfs.oplatency.alert | | warning |
| cifslisteners.failure | | critical |
| ... | ... | ... |
| VIFs were never created | offline | ok |
| At least one VIF is online | online | ok |
| All VIFs online | online | ok |
| No VIFs are online | offline | critical |
| Root volume is online and no mirrors online | online | warning |
| Root volume is missing or offline, and no mirrors online and virtual server is online | offline | critical |
| Virtual volume offline | | warning |
| Virtual volume restricted | | warning |
| Virtual volume full | | warning |
| ... | ... | ... |
| port.link.down | | informational |
| port.high.error.count | | warning |
| raid.vol.state.changed | | warning |
| cf.fsm.partnerNotResponding | | warning |
| cf.fm.givebackStarted | | informational |
| mgmtgwd.aggregate-used.rising | | warning |
| ... | ... | ... |

FIG. 6

| Grouping | Health Issue | Type | Attributes | Description |
|---|---|---|---|---|
| Virtual Server (vserver) | Vserver | vserver | key | Vserver name |
| | status | status | readonly | Status (online\|offline) |
| | health | health | readonly | Health (ok\|warning\|critical |
| | issues | list<text> | readonly | List of core vserver issues |
| | critical | unsigned | readonly | Number of critical issues |
| | warning | unsigned | readonly | Notice of warning issues |
| | informational | unsigned | readonly | Number of informational issues |
| Protocols | nfs-status | status | readonly | NFS Protocol Configuration Status (configured\|online\|offline) |
| | nfs-health | phealth | readonly | NFS Protocol Health (ok\|warning\|critical) |
| | cifs-status | pstatus | readonly | CIFS Protocol Configuration Status (configured\|online\|offline) |
| | cifs-health | phealth | readonly | CIFS Protocol Health (ok\|warning\|critical) |
| Virtual Interfaces (VIFs) | vif-total | unsigned | readonly | The total number of vifs |
| | vif-online | unsigned | readonly | The number of vifs currently online |
| | vif-offline | unsigned | readonly | The number of vifs currently offline |
| | vif-nothome | unsigned | readonly | The number of vifs currently not home |
| | vif-nofailover | unsigned | readonly | The number of vifs that have no failover rules |
| | vif-nothosted | unsigned | readonly | The number of vifs that are currently not hosted |
| Virtual Volumes | volume-total | unsigned | readonly | The total number of volumes |
| | volume-online | unsigned | readonly | The total number of volumes that are currently online |
| | volume-offline | unsigned | readonly | The total number of volumes that are currently offline |
| | volume-full | unsigned | readonly | The total number of volumes that are currently full |
| | volume-restricted | unsigned | readonly | The total number of volumes in the restricted state |
| | rvol-status | vol-state | readonly | Root volume status (online\|offline) |
| | rvol-mirrors-total | unsigned | readonly | The number of root volume mirrors |
| | rvol-vol-mirrors-online | unsigned | readonly | The number of root volume mirrors that are online |
| | aggr-total | unsigned | readonly | The number of aggregates that this vserver is using |

FIG. 7A

| | 715 | 720 | 725 | 730 |
|---|---|---|---|---|
| 710 | | | | |
| Physical Components | aggr-online | unsigned | readonly | The number of aggregates that the vserver is using that are online |
| | aggr-offline | unsigned | readonly | The number of aggregates that this vserver is using that are offline |
| | aggr-failover | unsigned | readonly | The number of aggregates that this vserver is using that have failed over to another node |
| | aggr-full | unsigned | readonly | The number of aggregates that have exceeded their user configured threshold for aggregate full |
| | ports-total | unsigned | readonly | The number of network ports this vserver is using |
| | ports-online | unsigned | readonly | The number of network ports this vserver is using that are online (linkup, others?) |
| | ports-shared | unsigned | readonly | The number of ports that have active vifs on them that are not home |

FIG. 7B

| Entry Name | Type | Attributes | Description |
|---|---|---|---|
| vserver | vserver_name | key | Vserver Name |
| component type | component_type | key | Component Type |
| component name | component_name | key | Component Name |
| time | Dateandtime | key | Date and Time that this health issue occurred |
| node | filename | key | Filename |
| severity | severity | readonly | Issue Severity |
| description | message | readonly | Issue Description |

FIG. 8A

| Entry Name | Type | Attributes | Description |
|---|---|---|---|
| vserver | vserver_name | key | Vserver Name |
| vif | virtual_interface | key | Virtual Interface Name |
| time | dateandtime | key | Date and Time that this health issue occured |
| node | filename | key | Filename |
| severity | severity | readonly | Issue Severity |
| description | message | readonly | Issue Description |

FIG. 8B

| Entry Name | Type | Attributes | Description |
|---|---|---|---|
| vserver | vserver_name | key | Vserver Name |
| volume | volume_name | key | Volume Name |
| time | dateandtime | key | Date and Time that this health issue occured |
| node | filename | key | Filename |
| severity | severity | readonly | Issue Severity |
| description | message | readonly | Issue Description |

FIG. 8C

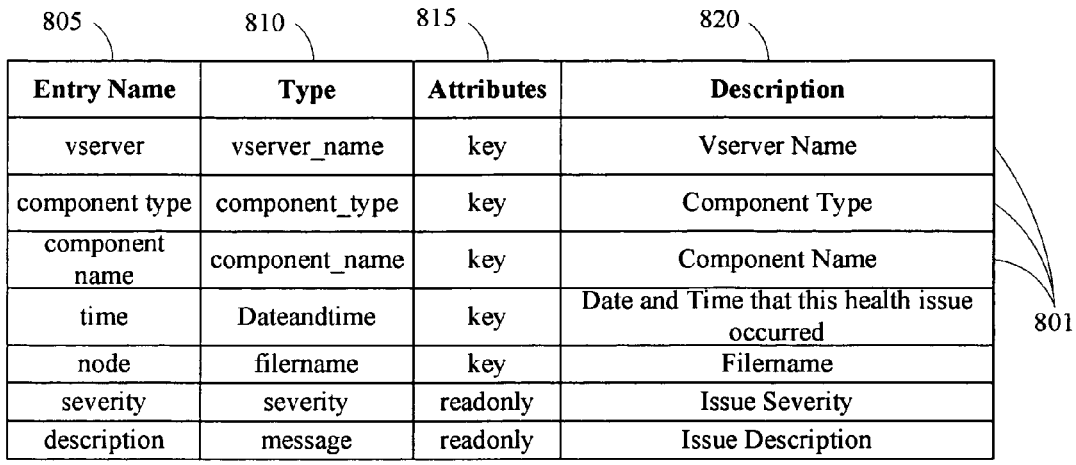

| Entry Name | Type | Attributes | Description |
|---|---|---|---|
| vserver | vserver_name | key | Vserver Name |
| aggregate | aggr_name | key | Aggregate Name |
| time | dateandtime | key | Date and Time that this health issue occured |
| node | filename | key | Filename |
| severity | severity | readonly | Issue Severity |
| description | message | readonly | Issue Description |

FIG. 8D

| Entry Name | Type | Attributes | Description |
|---|---|---|---|
| vserver | vserver_name | key | Vserver Name |
| component_type | component_type | key | Component Type |
| component_name | component_name | key | Component Name |
| time | dateandtime | key | Date and Time that this health issue occured |
| node | filename | key | Filename |
| severity | severity | readonly | Issue Severity |
| description | message | readonly | Issue Description |

FIG. 8E

AUTOMATED MONITORING AND REPORTING OF HEALTH ISSUES FOR A VIRTUAL SERVER

FIELD OF THE INVENTION

The present invention relates to storage systems and, more specifically, to automated monitoring and reporting of health issues for a virtual server.

BACKGROUND OF THE INVENTION

A storage system is a processing system adapted to store and retrieve information/data on storage devices (such as disks). The storage system includes a storage operating system that implements a file system to logically organize the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

Each server system may also be connected with a plurality of client systems through a computer network. Each client system may execute an application that connects to the server system over the network for sending read/write requests for accessing data of the storage system. In turn, applications executing on the server system may service the client systems by receiving client system access requests and submitting the access requests to the storage system for execution. To meet demands of high volumes of access requests from multiple client systems, a virtual server may be implemented.

A virtual server may comprise various portions (or the entirety) of two or more server systems and one or more storage systems, whereby the various portions spread among the server and storage systems are used collectively and in conjunction to receive and process access requests from the client systems. The virtual server may provide high availability of service to client systems in accessing storage devices of the storage system(s). For example, each server system within a virtual server may be configured to act collectively to offset any single server failure and/or to share/distribute access-request loads from client systems. While providing data-access service to the client systems, however, the virtual server may encounter health issues regarding its functions/operations or performance. Since components of the virtual server may be distributed among different server and storage systems, monitoring and reporting health issues of the virtual server may prove difficult.

SUMMARY OF THE INVENTION

A method and apparatus for automated monitoring and reporting of health issues for a virtual server is provided herein. In some embodiments, a virtual server comprises "virtual-server components" comprising virtual components and physical components, the physical components being distributed over a set of two or more server systems. A virtual server may further comprise physical components that are distributed over one or more storage systems. The virtual-server components are used by the virtual server to collectively provide data-access service to a set of client systems (e.g., by receiving and processing access requests from the client systems). Each server system within a virtual server may implement a health module that automatically monitors and reports problems and/or issues (referred to herein as "health issues") regarding the functions/operations or performance of the virtual server. In some embodiments, the set of health modules executing on set of server systems work in conjunction to monitor and/or report on health issues regarding the virtual-server components (comprising physical and/or virtual components) of the virtual server. As such, the health modules provide convenient and automated monitoring and reporting of health issues affecting the virtual server in providing data-access service to a set of client systems.

In some embodiments, each server system implemented by a virtual server may execute a virtual-server program that configures the server system to operate in conjunction with other server systems in the virtual server to receive and process requests from client systems. As such, the set of server systems that comprise the virtual server may be configured to work in combination to collectively provide data-access service to the client systems. For example, the set of server systems may be configured to act collectively to offset a server system failure (in the set of servers systems) or to share/distribute data-access loads from the client systems (within the set of servers systems). In some embodiments, the virtual-server program executing on each server system may also include the health module that configures the server system to operate in conjunction with other server systems to monitor and/or report on health issues of the virtual server. As such, a set of two or more health modules (executing on two or more server systems of the virtual server) may operate in conjunction to monitor and/or report on health issues of the virtual server.

In some embodiments, the set of health modules may perform a monitoring function that monitors a set of predetermined health issues/events for components of the virtual server. The monitoring function may further collect and store information ("health logs") regarding the predetermined health issues/events. The health logs may be stored in a health database. In some embodiments, the set of health modules may further perform a reporting function that produces a report on the set of predetermined health issues for the virtual server. The reporting function may retrieve health logs from the health database and process the health logs to produce a health report on the virtual server. A health report may summarize one or more retrieved health logs and may comprise a summary report or a topic report (a topic report covering a health topic in further detail).

The monitoring and/or reporting functions may be performed upon administrative command or at predetermined time intervals. The monitoring and/or reporting functions may be performed for health maintenance at predetermined time intervals so that information regarding the health issues is updated regularly and the health database contains current health logs (which are used to produce the summary and topic reports). The monitoring and/or reporting functions may also be performed upon administrative command for problem solving, for example, when a problem with the performance or function of the virtual server is encountered. In some embodiments, the monitoring and reporting functions monitor and report health issues for physical and/or virtual components of the virtual server.

In some embodiments, the functions of the health module may be dynamically changed while the virtual server continues to provide data-access service. For example, the set of predetermined health issues to be monitored or the contents of the summary report or topic reports may be dynamically modified. In some embodiments, the health module comprises a parameter interface for receiving configuration parameters to dynamically change the monitoring and/or reporting functions of the health module without requiring the software code of the health module to be modified.

BRIEF DESCRIPTION OF THE DRAWINGS

The novel features are set forth in the appended claims. However, for purpose of explanation, several embodiments of the invention are set forth in the following figures.

FIG. 6 shows a conceptual diagram of the contents of an exemplary health database;

FIGS. 7A-B show conceptual diagrams of the contents of an exemplary summary report;

FIGS. 8A-E show conceptual diagrams of the contents of exemplary topic reports;

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into three sections. Section I describes a virtual server environment in which some embodiments operate. Section II describes apparatus for automatically monitoring and reporting health issues of a virtual server. Section III describes methods for automatically monitoring and reporting health issues of a virtual server.

I. Virtual Server Environment

Figure 1:
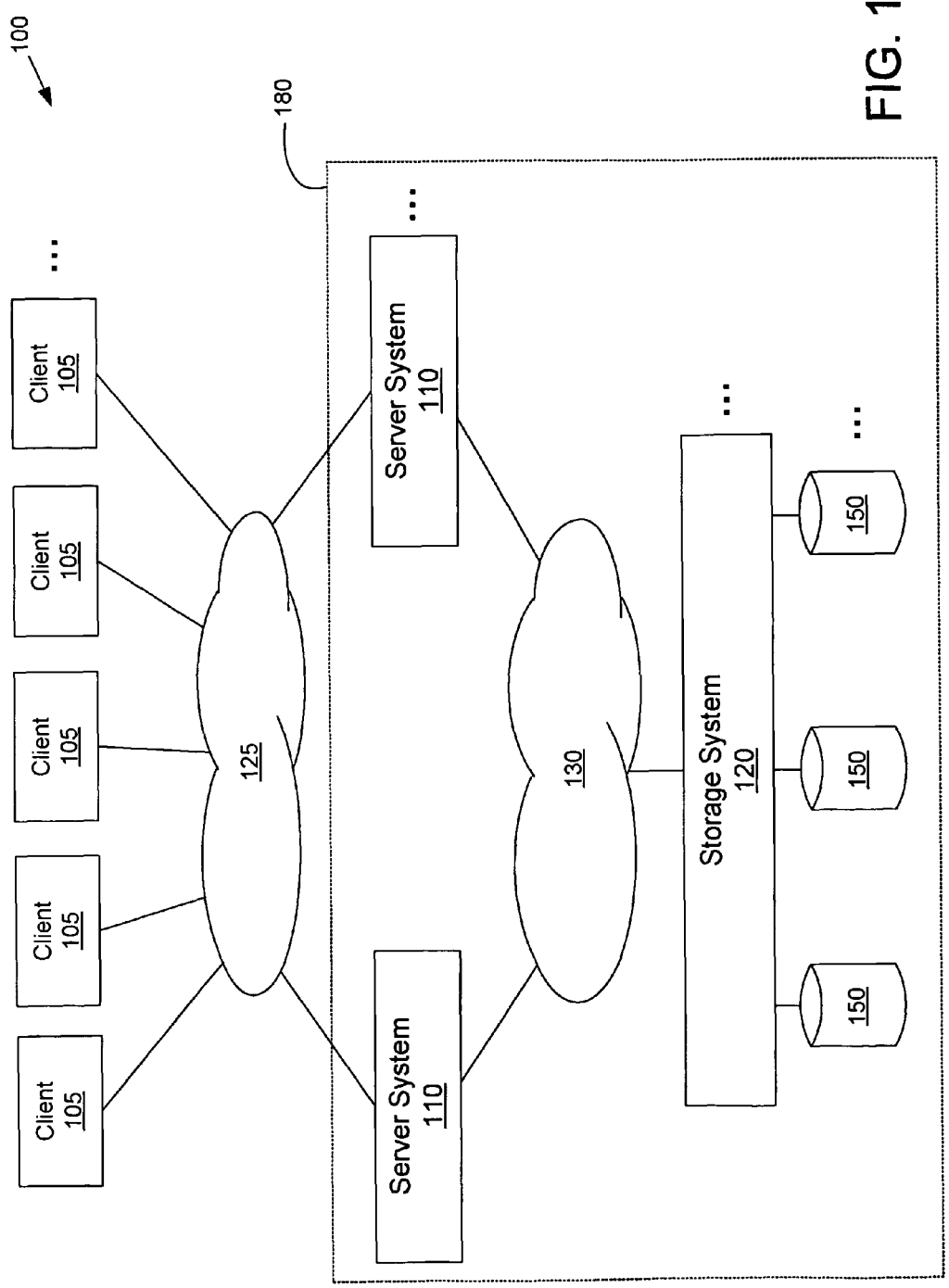
FIG. 1 is a block diagram of an exemplary virtual server environment in which some embodiments operate.

FIG. 1 is a block diagram of an exemplary virtual server environment 100 in which some embodiments operate. The environment 100 comprises a set of two or more server systems 110 connected to one or more client systems 105 via a network 125. The server systems 110 may each access one or more storage systems 120 (each storage system 120 having a set of one or more storage devices 150) that are connected to the server systems 110 via a network 130. Note that the server systems 110 are also connected to each other (e.g., via network 125 or network 130) for communicating with each other (e.g., for working collectively to provide data-access service to the client systems 105 and for collectively monitoring health issues, as described herein).

A client system 105 may comprise a computer system that may execute a client application that interacts with a server system 110 for submitting read/write access requests and for receiving or transmitting data to the server systems 110 over the network 125. A user may interface with the client application (e.g., through a user interface of the client application) to submit access requests. A server system 110 may comprise a computer system that may execute a server application that interacts with the client systems 105 for receiving read/write access requests from and for receiving or transmitting data to the client systems 105 over the network 125. A server system 110 may be connected to the clients 105 over a network 125, such as a local area network (LAN), a wide area network (WAN), metropolitan are network (MAN), the Internet, or the like.

A server application executing on a server system 110 may provide data-access service to client systems 105 by receiving and processing access requests from the client systems 105 for data from the storage system(s) 120. In turn, a server application utilizes services of the storage system 120 to access, store, and manage data in a set of storage devices 150. A storage system 120 may be coupled locally to a server system 110 over a network 130, such as a local area network (LAN), a wide area network (WAN), metropolitan are network (MAN), the Internet, or the like. Interaction between the server systems 110 and the storage system(s) 120 can enable the provision of storage services. That is, the server systems 110 may request the services of the storage system(s) 120 (by submitting read/write access requests), and the storage system(s) 120 may respond to access requests of the server systems 110 by receiving or transmitting data to the server systems 110 over the network 130 (e.g., by exchanging data packets through a connection over the network 130).

Communications between a storage system 120 and a server 110 are typically embodied as packets sent over the computer network 130. A server 110 may send an access request (read or write request) to the storage system 120 for accessing particular data stored on the storage system. The server 110 may request the services of the storage system 120 by issuing storage-access protocol messages formatted in accordance with a conventional storage-access protocol for accessing storage devices (such as CIFS, NFS, etc.). Access requests (e.g., read or write requests) may be implemented using issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

A server system 110 utilizes services of a storage system 120 to store and manage data. The storage system 120 may comprise a computer system that stores data in a set of one or more storage devices 125. A storage device 125 may comprise a writable storage device media, such as disk devices, video tape, optical, DVD, magnetic tape, flash memory, Magnetic Random Access Memory (MRAM), Phase Change RAM (PRAM), and any other similar media adapted to store information (including data and parity information).

As known in the art, a storage device 150 may have one or more storage volumes, where each volume has a file system implemented on the volume. A file system implemented on the storage devices 150 may provide multiple directories in a single volume, each directory containing zero or more filenames. A file system provides a logical representation of how data (files) are organized on a volume, where data (files) are represented as filenames that are organized in one or more directories. Examples of common file systems include New Technology File System (NTFS), File Allocation Table (FAT), Hierarchical File System (HFS), Universal Storage device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical unit numbers (LUNs).

The environment 100 also includes a virtual server 180 comprising various components distributed through two or more server systems 110. The virtual server 180 may further comprise various components distributed through one or more storage systems 120. The various components are used collectively and in conjunction to receive and process access requests from client systems 105 to provide data-access service to the client systems 105. A virtual server may contain all components of a server or storage system (whereby the entire server or storage system may be implemented by the virtual server 180) or a sub-set of components of a server or storage system (whereby a portion of a server or storage system may be implemented by the virtual server 180). The various components distributed among the server and/or storage systems 110 and 120 that are implemented by the virtual server 180 to provide data-access service to the client systems 105 are referred to herein as "virtual-server components." As such, a virtual-server component may comprise a physical component of a server or storage system 110 or 120. As discussed below, a virtual-server component may also comprise a virtual component comprising a conceptual component created for the virtual server.

Figure 2:
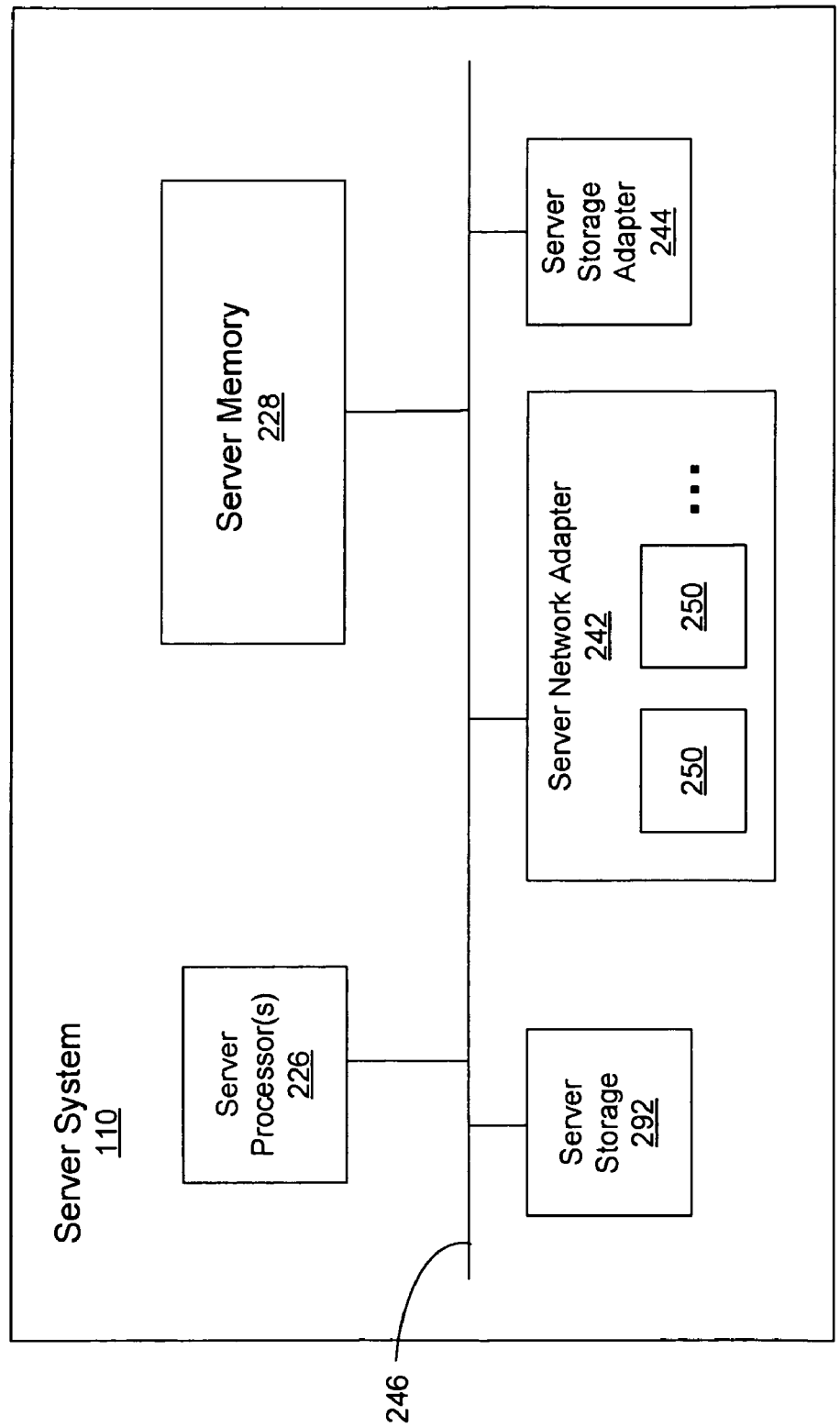
FIG. 2 is a diagram illustrating various components of a server system, in accordance with some embodiments.

FIG. 2 is a diagram illustrating various components of a server system 110, in accordance with some embodiments. The server system 110 comprises server processor(s) 226, server memory 228, a server network adapter 242, a server storage adapter 244, and a server storage 292 coupled by a bus 246.

The server processors 226 are the central processing units (CPUs) of the server system 110 and, thus, control the overall operation of the server system 110. Server processors 226 may include one or more programmable general-purpose or special-purpose microprocessors, digital signal processors (DSPs), programmable controllers, application specific integrated circuits (ASICs), programmable logic devices (PLDs), or the like, or a combination of such devices.

Server memory 228 comprises storage locations that are addressable by the processor 226 and adapters (a server network adapter 242 and a server storage adapter 244) for storing software program code, such as software described herein. The server processor 226 and server adapters may, in turn, comprise processing elements and/or logic circuitry configured to execute the software code. Server memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

A server network adapter 242 may comprise mechanical, electrical and signaling circuitry needed to connect the server system 110 to the network and to receive and transmit data over the network. The server network adapter 242 may comprise a network port controller (e.g., Ethernet cards), network adapter, or any other physical device that controls the receiving and transmitting of data over a network. A server network adapter 242 may provide one or more network ports 250 (i.e., data-access ports) for coupling the server system 110 to one or more other client systems 105 through a network 125. A connection with a client system 105 may be established using a network port 250 of the server network adapter 242 to receive and transmit data though the network 125.

The server storage adapter 244 cooperates with a server operating system 310 executing on the server system 110 to access data from storage devices 125 of a storage system 120. The server storage adapter 244 comprises a plurality of ports having input/output (I/O) interface circuitry that couples to the storage devices 125 over an I/O interconnect arrangement (such as a fibre channel (FC) link topology).

Figure 3:
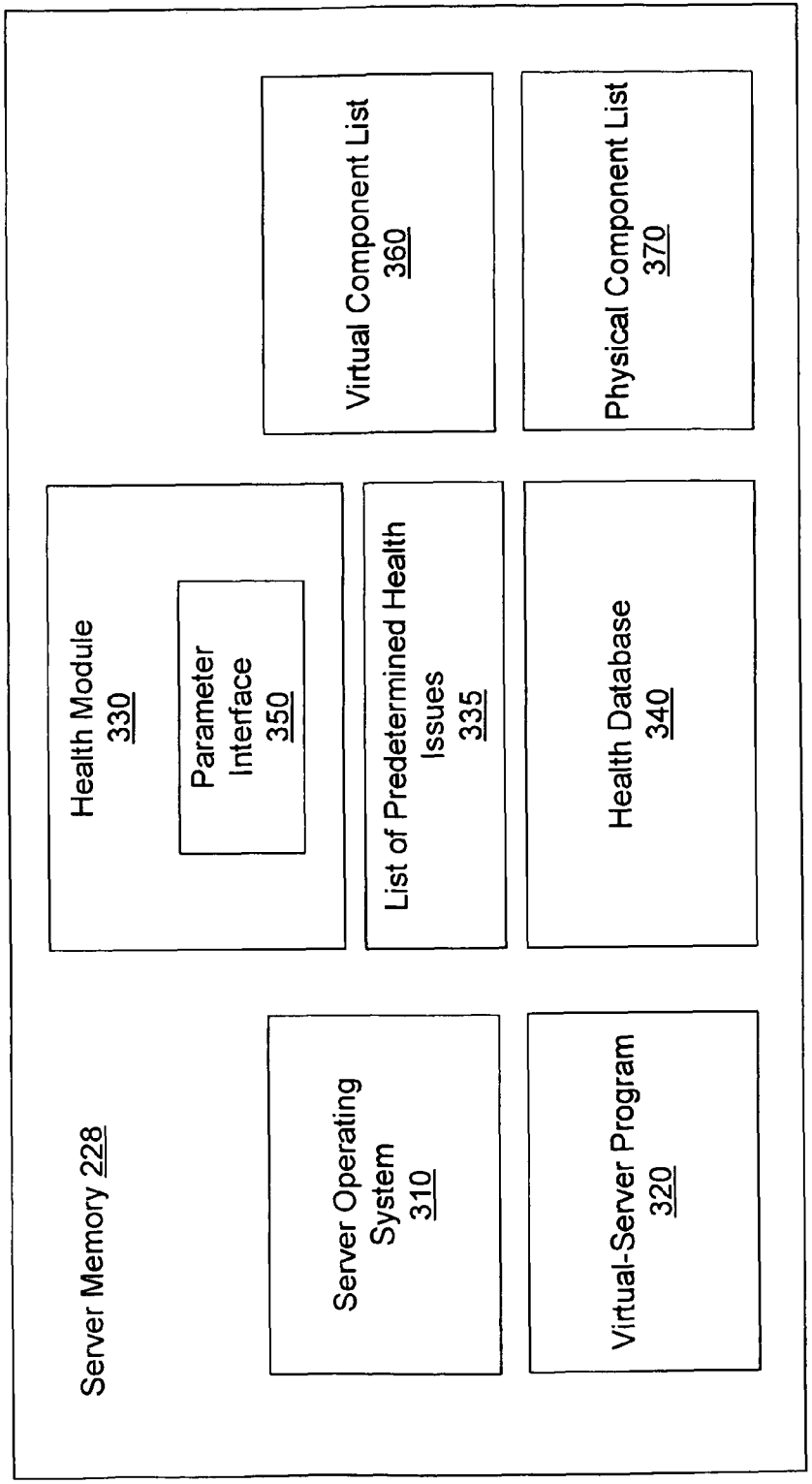
FIG. 3 shows a conceptual diagram of contents of the server memory.

Server storage 292 is a device that stores information within server system 110 (such as a server operating system 310, virtual-server program 320, health module 330, list of predetermined health issues 335, health database 340, virtual component list 360, or physical component list 370, shown in FIG. 3). Server system 110 loads information stored on the server storage 292 into server memory 228 from which they are accessed by server processors 226.

II. Apparatus for Automatically Monitoring and Reporting Health Issues of a Virtual Server A. Virtual-Server Program FIG. 3 shows a conceptual diagram of contents of the server memory 228. As discussed above in relation to FIG. 2, server memory 228 comprises storage locations for storing software code that are addressable by the processor 226 for executing the software code. Such software code may include a server operating system 310. The server operating system 310 can be, for example, UNIX®, Windows NT®, Linux®, or any other general-purpose operating system.

In some embodiments, each server system 110 implemented by a virtual server 180 may also store (in memory 228) and execute a virtual-server program 320. The virtual-server program 320 may configure the server system 110 to operate in conjunction with other server systems 110 in the virtual server 180 to collectively process access requests from client systems 105. As such, the set of server systems 110 that comprise the virtual server may be configured by the virtual-server programs 320 to work in combination to collectively provide data-access service to the client systems 105. Thus, the virtual server 180 may provide high availability of data-access service to client systems 105 in accessing storage devices 150 of the storage system(s) 120. In some embodiments, the virtual-server program 320 may comprise a software module that resides within the server operating system 310. In other embodiments, the virtual-server program 320 may comprise a software module that resides outside the server operating system 310.

For example, the set of server systems 110 (comprising the virtual server 180) may be configured by the set of virtual-server programs 320 to communicate with one another (e.g., via network 125 or network 130) to act collectively to offset a server system 110 failure within the set of server systems. When a server system 110 failure occurs where the failed server system 110 is no longer capable of processing access requests for client system 105, the virtual-server programs 320 may route/re-direct access requests sent to the failed server system 110 to other server systems 110 within the virtual server 180 for processing.

As a further example, the set of server systems 110 (comprising the virtual server 180) may be configured by the set of virtual-server programs 320 to communicate with one another (e.g., via network 125 or network 130) to act collectively to share/distribute access-request loads from the client systems 105 within the set of server systems. The virtual-server programs 320 may do so by monitoring work loads of the set of server systems 110 and routing/re-directing access requests for server system 110 with relatively heavy work loads to other server systems 110 within the virtual server 180 having relatively lighter work loads for processing.

The set of virtual-server programs 320 may also work in conjunction to provide a global namespace for the set of server systems 110. The global namespace may comprise a single shared file system or directory tree spanning multiple server systems 110 and multiple storage devices 150. The single shared file system may be accessible by all server systems 110 of the virtual server 180 and all client systems 105 interacting with the virtual server 180. In some embodiments, the virtual-server components include a set of one or more virtual volumes, each virtual volume comprising a sub-set of the global namespace.

Overall, as configured by the set of virtual-server programs 320, the virtual server 180 may provide a client connection (e.g., through a virtual interface), receive and process access requests (using network protocols) from client systems, relate these access requests to the global namespace, and provide access to storage devices 150 (using storage protocols). The virtual server 180 provide such data-access service to the client systems 105 in a transparent manner so that, from the view of a client system, the client system interacts with the virtual server 180, and not the individual server systems 110 or the various virtual-server components of the virtual server 180.

The virtual server 180, however, may encounter problems or issues (health issues) regarding its functions or performance while providing data-access service to the client systems 105. Note that the virtual server 180 may contain all components of a server system 110 or a storage system 120 (whereby the entire server or storage system may be implemented by the virtual server 180) or a sub-set of components of a server system 110 or a storage system 120 (whereby only a portion of a server or storage system may be implemented by the virtual server 180). As such, the "virtual-server components" implemented by the virtual server 180 may comprise physical components distributed among various server and storage systems. In addition, a virtual server 180 may also include virtual components comprising conceptual components created for the virtual server. As such, monitoring and reporting of health issues of the virtual-server components (including physical and virtual components) of a virtual server 180 may prove difficult.

B. Health Module

In some embodiments, each server system 110 implemented by a virtual server 180 may also store in memory 228 and execute a health module 330. The health module 330 may comprise a software program that configures the server system 110 to operate in conjunction with other server systems 110 in the virtual server 180 to collectively monitor and/or report on health issues regarding the virtual server 180. As such, a set of two or more health modules 330 (executing on two or more server systems 110 of the virtual server 180) may operate in conjunction to monitor and/or report on health issues of the virtual server 180. In some embodiments, the set of health modules 330 may operate in conjunction to automatically monitor and/or report on health issues of the virtual server 180 without requiring human initiation or intervention. In some embodiments, the health module 330 may comprise a software module that resides within the virtual-server program 320. In other embodiments, the health module 330 may comprise a software module that resides outside the virtual-server program 320.

In some embodiments, the set of health modules 330 may perform a monitoring function that monitors a set of predetermined health issues/events for virtual-server components of the virtual server 180. The set of predetermined health issues to be monitored may be determined (e.g., by an administrator or modified by a user) and stored as a list of predetermined health issues 335 (e.g., stored in server memory 228 and/or server storage 292) to be monitored. The monitoring function may further collect and store information ("health logs") regarding the predetermined health issues/events. The health logs may be stored in a health database 340 which may be stored, for example, in server memory 228 and/or server storage 292. In some embodiments, a health module 330 executing on a server system 110 monitors physical components located within the server system 110 and virtual components having underlying physical components located within the server system 110.

In some embodiments, the set of health modules 330 may further perform a reporting function that produces a report on the set of predetermined health issues for the virtual server 180. The reporting function may retrieve health logs from the health database 340 and process the health logs to produce a health report on the virtual server 180. A health report may summarize one or more retrieved health logs and may comprise a summary report or a topic report (a topic report covering a health topic in further detail).

The monitoring and/or reporting functions may be performed upon administrative command or at predetermined time intervals. The monitoring and/or reporting functions may be performed for health maintenance at predetermined time intervals so that information regarding the health issues is updated regularly and the health database 330 contains current health logs (which are used to produce the summary and topic reports). The monitoring and/or reporting functions may also be performed upon administrative command for problem solving, for example, when a problem with the performance or function of the virtual server is encountered. In some embodiments, the monitoring and reporting functions monitor and report health issues for physical and/or virtual components of the virtual server 180.

In some embodiments, the functions of the health module 330 may be dynamically changed while the virtual server 180 continues to provide data-access service. For example, the set of predetermined health issues to be monitored or the contents of the summary report or topic reports may be dynamically modified. In some embodiments, the health module 330 comprises a parameter interface 350 for receiving configuration parameters to dynamically change the monitoring and/or reporting functions of the health module 330. Configuration parameters may comprise predetermined health issues to be monitored or specified contents to be contained in the summary or topic reports. In some embodiments, configuration parameters may be received from a user through the parameter interface 350 which comprises a user interface (such as, a graphical user interface or command line interface). In other embodiments, configuration parameters may be received from a program through the parameter interface 280 which comprises a program interface, such as, an application program interface (API). The received configuration parameters may dynamically change the monitoring and/or reporting functions of the health module 330 without requiring the software code of the health module 330 to be modified.

As such, the set of health modules 330 may provide automated monitoring and reporting of operation and performance events of the overall virtual server 180 rather than only the individual server systems 110 or virtual-server components that comprise the virtual server 180. Such monitoring and reporting may be beneficial since, from the view of a client system, the client system interacts with the virtual server, and not the individual server systems or virtual-server components.

C. Monitoring Function of the Health Module

As discussed above, the set of health modules 330 may perform a monitoring function that monitors a set of predetermined health issues/events relating to the performance or function/operation of virtual-server components of the virtual server 180. The set of health issues may comprise sub-sets of health issues of different types relating to different aspects of the virtual server 180, such as configuration settings, virtual components, and/or physical components of the virtual server 180. In other embodiments, the predetermined health issues may comprise health issues relating to other aspects of the virtual server 180.

The sub-set of health issues relating to configuration settings (referred to as "configuration health issues") may include health issues relating to whether set-up procedures (required to allow the virtual server to perform access requests for client systems 105) were properly performed. The set-up procedures may include configuration procedures to be performed prior to putting the virtual server online to receive and process access requests from client systems 105. Configuration health issues may also relate to whether set-up procedures were performed according to predetermined policy that provide configuration recommendations for providing better data-service performance. Configuration health issues may further relate to whether storage and network access protocols (e.g., CIFS, NFS, TCP/IP, FCP, iSCSI, etc.) were properly configured.

The sub-set of health issues relating to virtual components of the virtual server 180 (referred to as "virtual component health issues") may include health issues relating to conceptual components created for use by the virtual server 180 in providing data-access service to client systems 105. In forming a virtual server, a set of virtual components may be allocated for use by the virtual server, each virtual component in the set having an associated unique identifier within the virtual server. The unique identifier of a virtual component is also used by the client systems 105 when accessing the virtual server for data-access service. A list of virtual components 360 (e.g., a list of virtual-component identifiers) of the virtual server 180 may be stored on a server or storage system (e.g., in server memory 228 or server storage 292) and used by the health module 330 to determine which virtual components to monitor and report on. For example, the list of virtual components 360 may comprise virtual interfaces (VIF0 to VIFn) and virtual volumes (VVol0 to VVoln).

At any given time, a virtual component may be connected/associated (e.g., by an administrator or software program) with an underlying physical component on a server or storage system, each physical component having an associated unique identifier within the server or storage system. As such, in forming a virtual server, a set of physical components may be allocated for use by the virtual server, each physical component being associated with a corresponding virtual component in the virtual server 180. A list of physical components 370 (e.g., a list of physical-component identifiers) of the virtual server 180 may be stored on a server or storage system (e.g., in server memory 228 or server storage 292) and used by the health module 330 to determine which physical components to monitor and report on. Each physical component in the list of physical components 370 may correspond to an associated virtual component in the list of virtual components 360.

A virtual component may, however, transparently change association (e.g., as initiated by an administrator or software program) from one physical component to another physical component (within the same server or storage system or across different server or storage systems) during operation of the virtual server 180 as needed. For example, a virtual component may change association from a current physical component to a new physical component if the current physical component fails or is taken offline. For a virtual component, a change from a current associated physical component to a new associated physical component may occur transparently to a client system 105, whereby data regarding the change to the new physical component does not need to be sent to the client system 105 and the client system 105 does not need to be re-configured to use the new physical component to continue receiving data-access service. As such, the change to a new associated physical component may occur transparently to a client system 105 so that data-access service to the client system 105 continues uninterrupted during/throughout the change.

Also, during a change of association to a new physical component, a virtual component retains the same unique identifier within the virtual server 180 through the change of association. As such, the list of virtual components 360 for a virtual server 180 is persistent and is not modified through changes in the underlying physical components of the virtual server 180. In contrast, the list of physical components 370 for a virtual server 180 is transitory and may be modified to contain new physical components whenever changes in the underlying physical components of the virtual server 180 are made. As discussed above, the unique identifier of a virtual component may be used by the client systems 105 when accessing the virtual server for data-access service, whereby the unique identifier of a virtual component does not change during changes in association with new physical components. As such, when accessing the virtual server, a client system 105 may view and have knowledge of only the virtual component (through the virtual component identifier) rather than the underlying physical component, so that changes in the underlying physical components are transparent to the client system 105.

The sub-set of health issues relating to physical components of the virtual server 180 (referred to as "physical component health issues") may include health issues relating to physical resources (as shown in the list of physical components 370) implemented by the virtual server 180 in providing data-access service to client systems 105. Such physical components/resources may include network ports 250 and aggregates 510. As discussed below in relation to FIG. 4, a network port 250 may provide a network connection between a server system 110 and a client system 105. As discussed below in relation to FIG. 5, an aggregate may comprise a set of storage devices 150 of a storage system 120.

D. Virtual Interface and Virtual Volume

As described above, a virtual-server component of a virtual server 180 may comprise a physical component of a server or storage system 110 or 120 or a virtual component having an associated underlying physical component of a server or storage system 110 or 120. In some embodiments, virtual-server components may include a physical component comprising a network port 250 of a server system 110 and a virtual component comprising a virtual interface (VIF) having an associated underlying network port 250 of a server system 110. In some embodiments, virtual-server components may include a physical component comprising an aggregate of a storage system 120 and a virtual component comprising a virtual volume (VVol) having an associated underlying aggregate of a storage system 120.

Figure 4:
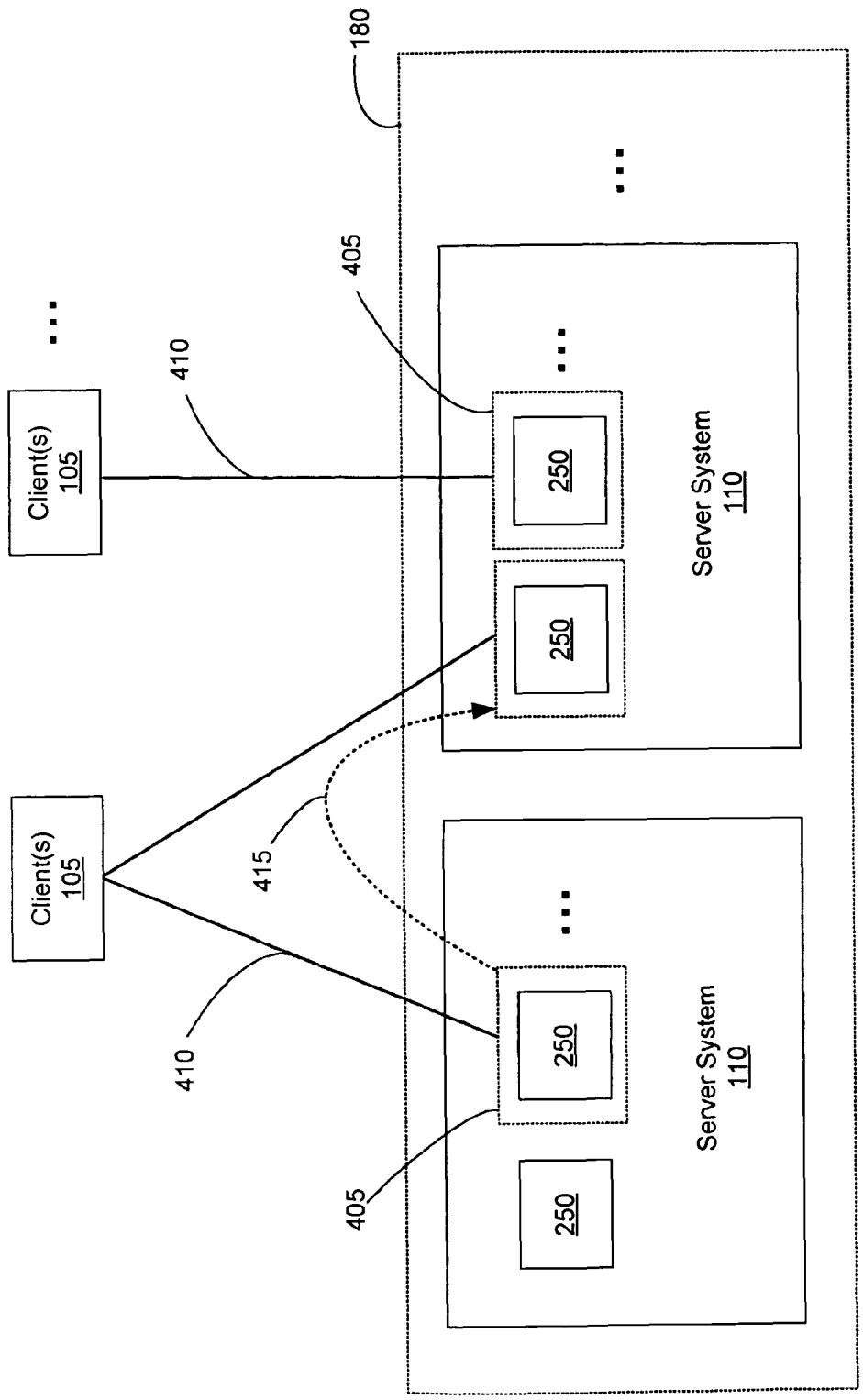
FIG. 4 shows a conceptual diagram of virtual interfaces implemented by the virtual server.

FIG. 4 shows a conceptual diagram of virtual interfaces 405 implemented by the virtual server 180. Each virtual interface 405 may have an associated underlying network port 250 residing on a server system 110. A virtual interface 405/network port 250 may provide a network connection 410 between the virtual server 180 and a client system 105 to provide data-access service to the client system 105. Each virtual interface 405 may have an associated unique identifier (e.g., an IP address endpoint) within the virtual server 180 that is received and used by the client system 105 to establish the network connection 410.

A virtual interface 405 may transparently change association 415 from one network port 250 to another network port 250 (within the same server system 110 or across different server systems 110) while data-access service to a client system 105 continues uninterrupted through the change. The virtual interface 405 may retain the same identifier (e.g., an IP address endpoint) with the client system 105 through the change of association 415 so that changes of the underlying network ports 250 occur transparently to a client system 105 connected with a virtual interface 405. As such, the network connection 410 with the client system 105 is maintained transparently to the client system 105 as changes of association 415 of the underlying network ports 250 occur.

Figure 5:
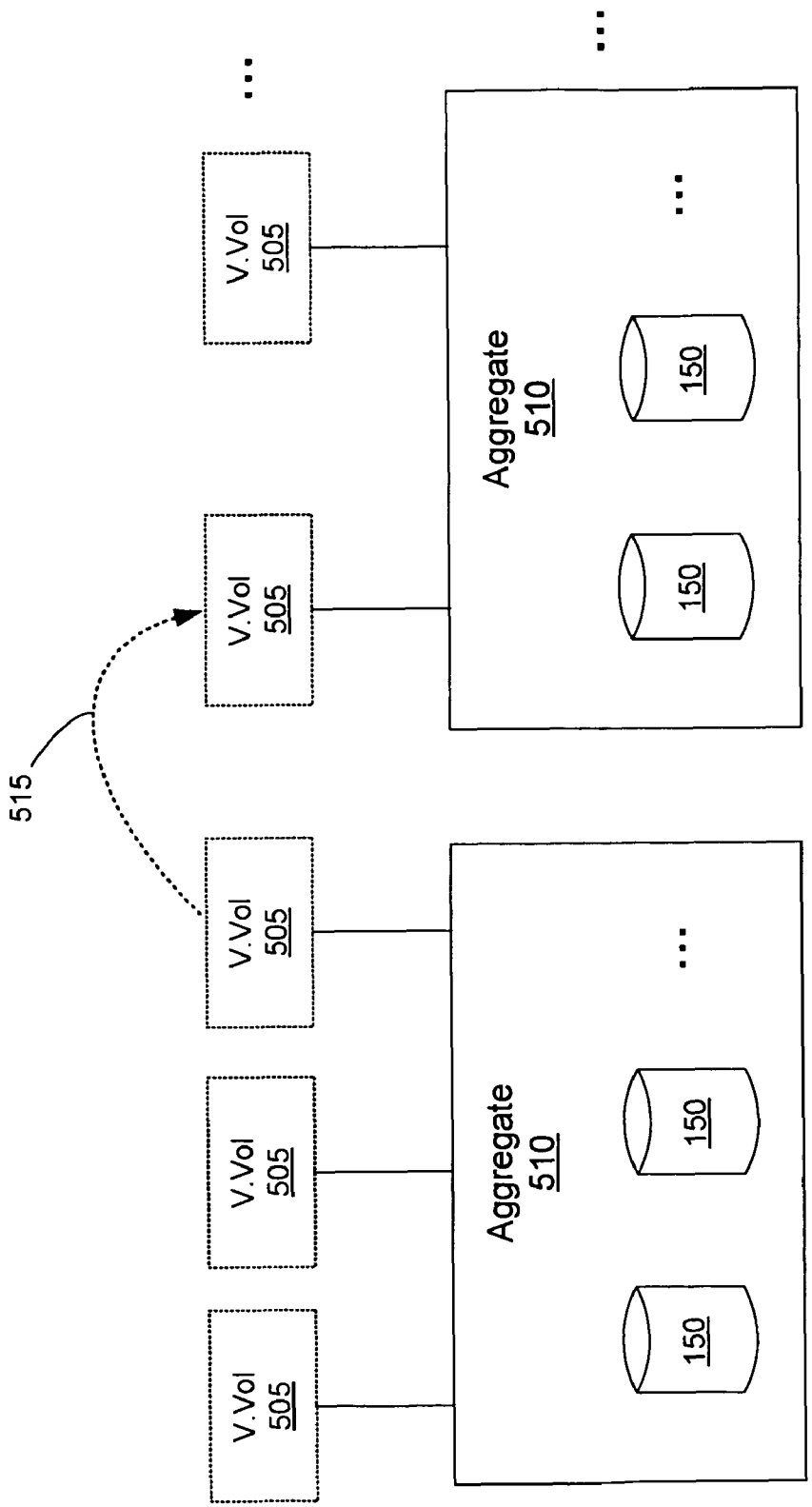
FIG. 5 shows a conceptual diagram of virtual volumes implemented by the virtual server.

FIG. 5 shows a conceptual diagram of virtual volumes 505 implemented by the virtual server 180. Each virtual volume 505 may have an associated underlying aggregate 510 residing on a storage system 120. One or more aggregates 510 may reside on each storage system 120. An aggregate 510 may comprise a total storage space provided by a set of one or more storage devices 150 of a storage system 120. The total storage space of an aggregate 510 may be allocated among a set of one or more virtual volumes 505, each virtual volume 505 comprising a sub-set of the total storage space of the aggregate 510. A virtual volume 505 may be dynamically increased or decreased in storage size within the total storage space of the aggregate 510. In some embodiments, the virtual volumes implemented by a virtual server 180 comprise the global namespace, each virtual volume comprising a sub-set of the global namespace. As such, each virtual volume 505 may also be dynamically increased or decreased in storage size within the global namespace. A single aggregate 510 may contain virtual volumes 505 that belong to different virtual servers and a set of server systems and storage systems may support a plurality of virtual servers. Virtual volumes 505 used by one virtual server may not be accessible to another virtual server.

Each virtual volume 505 may have an associated unique identifier (e.g., a volume name) within the virtual server 180 that is received and used by the client system 105 access the virtual volume 505. A virtual volume 505 may transparently change association 515 from one aggregate 510 to another aggregate 510 (within the same storage system 120 or across different server systems 110) while data-access service to a client system 105 continues uninterrupted through the change. The virtual volume 505 may retain the same identifier (e.g., volume name) with the client system 105 through the change of association 515 so that changes of the underlying aggregates 510 occur transparently to a client system 105 accessing a virtual volume 505. As such, data-access of a virtual volume 505 is maintained transparently to the client system 105 as changes of association 515 of the underlying aggregates 510 occur.

E. Health Database

The monitoring function of the set of health modules 330 may collect and store information ("health logs") regarding predetermined health issues/events of the virtual server 180 in health databases 340. The set of predetermined health issues/events may relate to the performance or function/operation of virtual-server components of the virtual server 180. In some embodiments, each health module 330 executing on a particular server system 110 may perform the monitoring function on physical components located within the particular server system 110 as well as virtual components having underlying physical components located within the particular server system 110. The health module 330 may also store and maintain the health database 340 on the particular server system 110 (e.g., stored in server memory 228 and/or server storage 292). The health module 330 may collect information regarding the predetermined health issues using server operating system 310 calls and functions (such as network monitoring techniques used for monitoring events and polling states of components).

FIG. 6 shows a conceptual diagram of the contents of an exemplary health database 340. In the example of FIG. 6, the set of health issues may comprise sub-sets of health issues including a sub-set of configuration health issues 605, a sub-set of virtual component health issues 610, and a sub-set of physical component health issues 615. In the example of FIG. 6, the health database 340 comprises a plurality of health-log entries 601, each health-log entry 601 comprising information regarding a predetermined health issue. The health module 330 may check/monitor each predetermined health issue 630 (e.g., using server operating system calls and functions) and determine information for each field for the predetermined health issue 630 (depending on the results of the check) in the health-log entry 601.

A health-log entry 601 for a predetermined health issue may comprise data fields for a predetermined health issue 630, status 635, health flag 640, or any combination of these. In other embodiments, a health-log entry 601 may contain other fields. In some embodiments, health-log entries 601 for predetermined health issues may contain different fields depending on the predetermined health issue. The status field 635 may indicate whether the predetermined health issue 630 is configured (e.g., a protocol is configured), offline (a component is unavailable for access by client clients 105), or online (a component is available for access by client clients 105). The health flag field 640 may indicate a health severity level relating to the situation or condition of the predetermined health issue 630 (e.g., "OK," "Warning," "Critical," "Informational," etc.). A health level shown in a health flag field 640 may have different meanings depending on the predetermined health issue 630.

The sub-set of configuration health issues 605 may include health issues relating to whether set-up procedures (required to allow the virtual server to perform access requests for client systems 105) were properly performed. Some examples of health-log entries 601 for configuration health issues 605 are shown in FIG. 6. As shown in FIG. 6, configuration health issues 605 may be related to configuration of network storage access protocol (such as NFS or CIFS protocols). For example, the configuration health issue 605 "nfs.oplatency.alert" may indicate that the client access for NFS protocols through a connection in the virtual server 180 is too slow.

The sub-set of virtual component health issues 610 may include health issues relating to conceptual components (e.g., as shown in the list of virtual components 360) created for use by the virtual server 180. Some examples of health-log entries 601 for virtual component health issues 610 for virtual interfaces (VIFs) and virtual volumes are shown in FIG. 6. Note that for virtual volumes, the health database 340 may contain health-log entries 601 for the root virtual volume of the virtual server 180 and for non-root virtual volumes. The root volume for a virtual server may comprise a base of the client-access global name space so that if the root volume becomes unavailable, the client systems 105 may not able to access any of the other virtual volumes in the global name space.

For the root volume, a health flag 640 of "Ok" may indicate that the root volume is online and the root volume load-sharing mirrors are online, a health flag 640 of "Warning" may indicate the root volume is online however the load-sharing mirrors do not exist or are not online or the root volume is offline but load-sharing mirrors are available, and a health flag 640 of "Critical" may indicate the root volume is offline and there are no mirrors or the mirrors are offline. Note that when the root volume is offline the virtual server 180 will also be offline. Note that administrators may create read-only copies of the root volume called "Load-Sharing Mirrors" (LSM) on each storage system. These mirrors of the root volume may help spread out the load of client accesses. For non-root virtual volumes, the predetermined health issues may comprise whether the volume is offline (volume is unavailable to client systems 105), restricted (volume is unavailable to client systems 105 but is still available for administrative operations), or full (storage space of the volume is filled past a threshold level). As discussed above, the virtual volumes implemented by a virtual server 180 comprise the global namespace, each virtual volume comprising a sub-set of the global namespace. As such, if a virtual volume is offline, restricted, or full, this indicates that a sub-set of the global namespace may be inaccessible or unavailable to client systems 105.

The sub-set of physical component health issues 615 may include health issues relating to physical resources (e.g., as shown in the list of physical components 370) implemented by the virtual server 180. Some examples of health-log entries 601 for physical component health issues 615 for network ports and aggregates are shown in FIG. 6. Note that for network ports, "port.high.error.count" is equal to the sum of the port send-errors, receive-errors, and receive-dropped errors. In the example of FIG. 6, health issues related to network ports start with "port," health issues related to aggregates and storage systems start with "raid" or "cf."

In other embodiments, the health database 340 may contain other configuration health issues 605, virtual component health issues 610, or physical component health issues 615 than the examples given. The health module 330 may perform the monitoring function at predetermined time intervals so that the health logs regarding the predetermined health issues stored in the health database 340 are updated regularly and the health database 340 contains current health logs (which are used to produce the summary and topic reports). When the situation or condition of a predetermined health issue changes (e.g., the predetermined health issue is resolved), the new information collected for the changed predetermined health issue is used to modify the health database 340 (e.g., is used to modify or delete a health log in the health database 340 containing old information regarding the predetermined health issue). The monitoring function may also be performed upon administrative command for problem solving, for example, when a problem with the performance or function of the virtual server 180 is encountered.

F. Reporting Function of the Health Module

In some embodiments, the set of health modules 330 may perform a reporting function that produces a report on the set of predetermined health issues for the virtual server 180. The reporting function may retrieve health logs 601 from the health database 340 and process the health logs 601 to produce a health report on the virtual server 180. The health report may comprise a summary report and/or a set of topic reports (each topic report covering a particular health topic in further detail). The reporting function may be performed upon administrative command (e.g., for resolving an encountered problem) or at predetermined time intervals (e.g., for performing routine maintenance). In some embodiments, the reporting function reports health issues for physical and/or virtual components of the virtual server (vserver).

As discussed above, the set of health modules 330 (executing on the set of server systems 110) may perform the monitoring function at predetermined time intervals to update health logs 601 stored in the health databases 340 so that health logs 601 used to produce the summary and topic reports are current (and indicate which predetermined health issues are currently open/unresolved). When the report function is triggered (e.g. by administrative command or by occurrence of a predetermined time interval), the set of health modules 330 may retrieve the health logs 601 in the health databases 340 stored on the server systems 110. The set of health module 330 collects the health logs 601 retrieved from the various health databases 340 and processes and analyzes the collection of health logs 601 to produce one or more health reports (summary and/or topic reports) for the virtual server (vserver). In some embodiments, a health report may only contain information regarding open predetermined health issues that are currently unresolved.

FIGS. 7A-B show conceptual diagrams of the contents of an exemplary summary report 705. In the examples of FIGS. 7A-B, the summary report 705 contains a summary of health issues concerning the overall virtual server, including a summary of issues relating to configuration settings (such as protocol settings), virtual components (such as virtual interfaces/VIFs and virtual volumes), and/or physical components (such as network ports and aggregates) of the virtual server 180.

The summary report 705 may contain a plurality of summary entries 701, each summary entry 701 comprising data fields including grouping 710, predetermined health issue 715, type 720, attributes 725, description 730, or any combination of these. In other embodiments, a summary entry 701 may contain other fields. The grouping field 710 may indicate a general topic (such as overall virtual server, configuration/protocols, virtual interfaces, virtual volumes, or physical components) the summary entry 701 is related to. A type field 720 may indicate the underlying data type and an attribute field 725 may indicate the role of the field or the user accessibility (such as key, read-only (access), write (access), etc.). A description field 730 may provide a summary description of the situation or condition of the predetermined health issue 715. The summary description may be produced by the reporting function of the health module 330 based on the collected health logs relating to the predetermined health issue 715.

FIGS. 8A-E show conceptual diagrams of the contents of exemplary topic reports. A topic report may cover a particular type of health issue in further detail. FIGS. 8A-E show conceptual diagrams of the contents of exemplary topic reports. FIG. 8A shows an exemplary topic report on configuration/protocol settings. FIG. 8B shows an exemplary topic report on virtual interfaces (VIFs). FIG. 8C shows an exemplary topic report on virtual volumes. FIG. 8D shows an exemplary topic report on aggregates. And FIG. 8E shows an exemplary topic report on network ports.

As shown in FIGS. 8A-E, a topic report may comprise a plurality of topic entries 801, each topic entry 801 comprising data fields including entry name 805, type 810, attributes 815, description 820, or any combination of these. In other embodiments, a topic entry 801 may contain other fields. A type field 810 may indicate the underlying data type and an attribute field 815 may indicate the role of the field or the user accessibility. A description field 820 may provide a message to the administrator as to what the health issue is and information on how to resolve the health issue.

Figure 9:
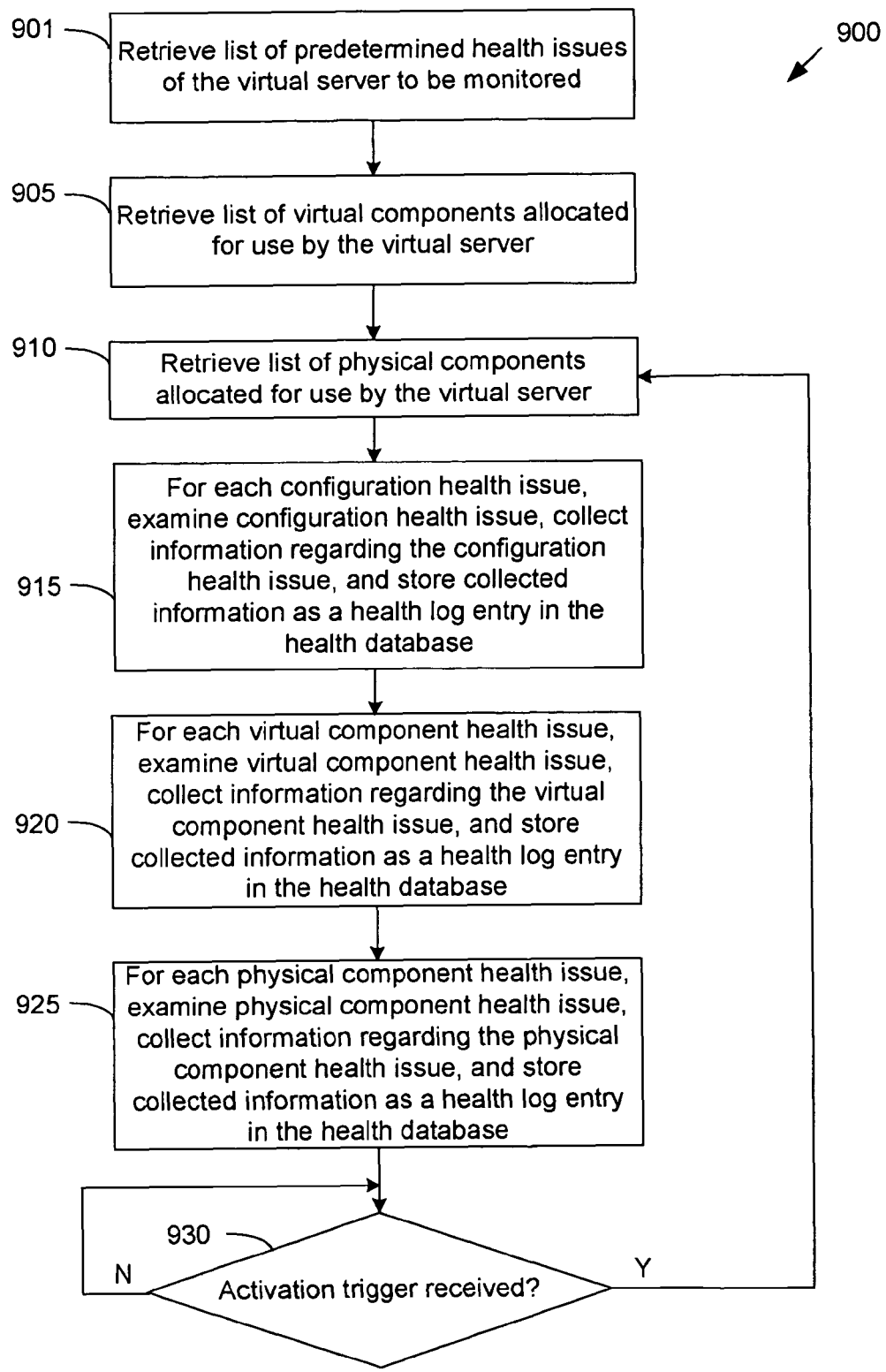
FIG. 9 shows a flowchart of operations of a monitoring function of the health module.
Figure 10:
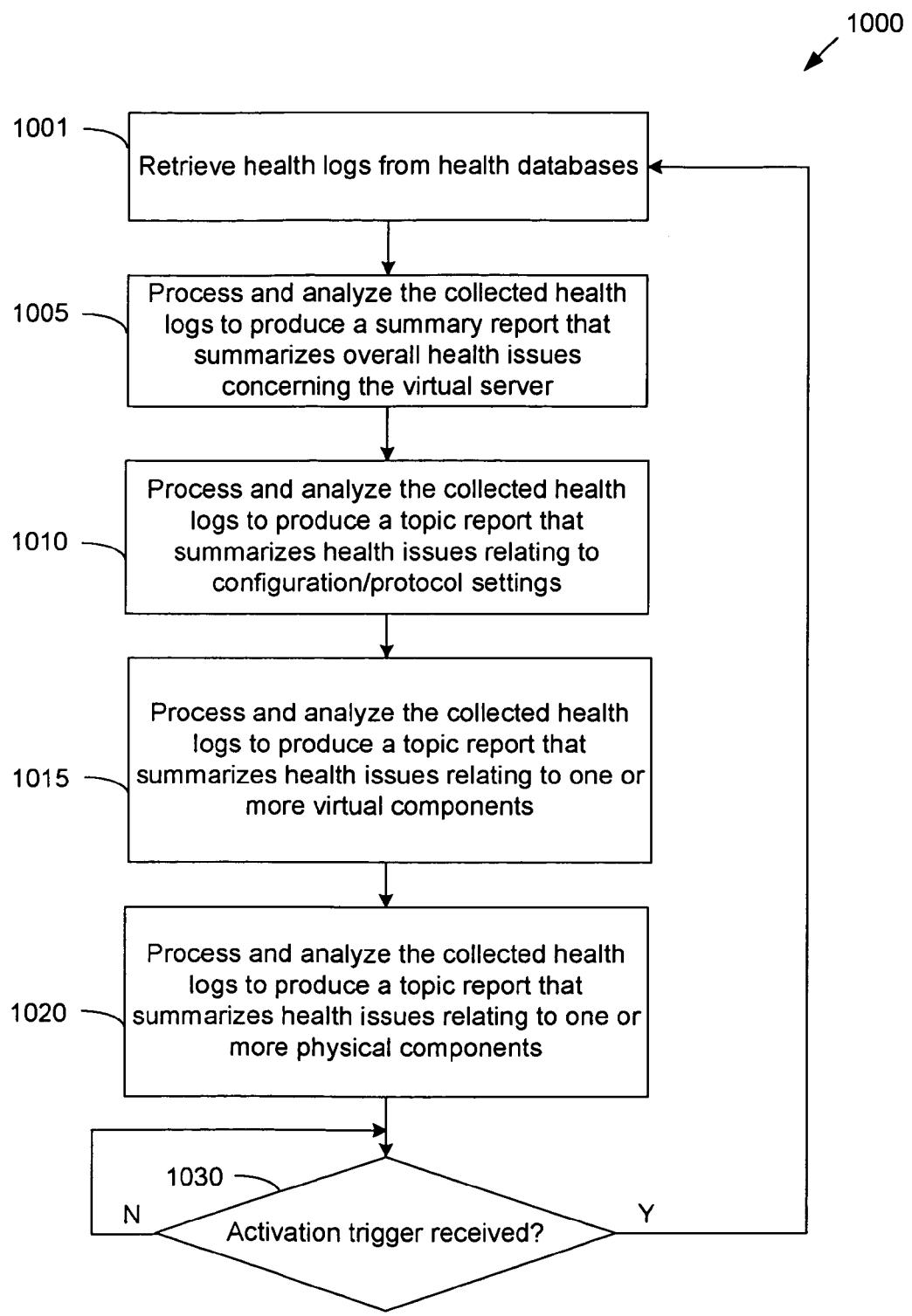
FIG. 10 shows a flowchart of operations of a reporting function of the health module.

III. Methods for Automatically Monitoring and Reporting Health Issues of a Virtual Server FIGS. 9-10 are flowcharts of methods for automatically monitoring and reporting health issues for a virtual server in accordance with some embodiments. FIG. 9 shows a flowchart of operations of a monitoring function. In some embodiments, some of the steps of the monitoring method 900 are implemented by software or hardware. In some embodiments, some of the steps of method 900 are performed by a set of health modules 330 executing on a set of server systems 110 used by the virtual server 180. In some embodiments, each health module 330 executing on a server system 110 monitors physical components located within the server system 110 and virtual components having underlying physical components located within the server system 110. In some embodiments, some steps of the method 900 are performed automatically without human initiation, interaction, or intervention. The order and number of steps of the method 900 are for illustrative purposes only and, in other embodiments, a different order and/or number of steps are used. The monitoring method 900 may be initiated by administrative command or upon occurrence of a predetermine time interval.

The monitoring method 900 begins by retrieving (at 901) a list of predetermined health issues 335 (e.g., stored in server memory 228 or server storage 292) of the virtual server 180 to be monitored. The list of predetermined health issues 335 may comprise sub-sets of configuration health issues, virtual component health issues, and physical component health issues of the virtual server 180. In other embodiments, the predetermined health issues may comprise health issues relating to other aspects of the virtual server 180.

The method 900 then retrieves (at 905) a list of virtual components 360, e.g., stored in server memory 228 or server storage 292. The list of virtual components 360 may comprise virtual components allocated for use by the virtual server 180, each virtual component having an associated unique identifier within the virtual server 180. The method 900 then retrieves (at 910) a list of physical components 370, e.g., stored in server memory 228 or server storage 292. The list of physical components 370 may comprise physical components allocated for use by the virtual server 180, each physical component having a corresponding associated virtual component in the list of virtual components 360. The list of virtual components 360 and the list of physical components 370 may comprise virtual-server components used by the virtual server 180 to provide data-access service to client systems 105, the virtual-server components being distributed across two or more server systems 110. The virtual-server components may also be distributed over one or more storage systems 120. The method may use the lists 360 and 370 to determine the virtual-server components to monitor.

For each configuration health issue in the sub-set of configuration health issues, the method 900 examines/checks (at 915) the configuration health issue, collects information regarding the configuration health issue, and stores the collected information as a health log entry 601 in the health database 340. For each virtual component health issue in the sub-set of virtual component health issues, the method 900 examines/checks (at 920) the virtual component health issue, collects information regarding the virtual component health issue, and stores the collected information as a health log entry 601 in the health database 340. For each physical component health issue in the sub-set of physical component health issues, the method 900 examines/checks (at 925) the physical component health issue, collects information regarding the physical component health issue, and stores the collected information as a health log entry 601 in the health database 340.

The method then determines (at 930) whether an activation trigger for performing the monitoring function is received. For example, the activation trigger may comprise receiving an administrative command to perform the monitoring function or may comprise the occurrence of a predetermine time interval. If the activation trigger is not received (at 930—No), the method continues at 930. If the activation trigger is received (at 930—Yes), the method continues at step 910 where it retrieves a list of physical components 370 allocated for use by the virtual server 180.

Note that, when needed, a virtual component may transparently change association from one physical component to another physical component (within the same server or storage system or across different server or storage systems). While the list of virtual components 360 may be persistent and not modified through changes in the underlying physical components of the virtual server 180, the list of physical components 370 may be modified from time to time to contain physical components currently used by the virtual server 180. As such, in some embodiments, at each iteration of the method 900, the method 900 re-retrieves the list of physical components 370 and different iterations of the method 900 may use lists of physical components 370 identifying different physical components of the virtual server 180 for monitoring.

As such, since the monitoring method 900 uses the lists of physical components 370 (which contains the physical components presently being implemented by the virtual server 180) to determine which physical components to monitor, the monitoring method 900 may provide automated monitoring of the virtual components and underlying physical components of the virtual server, even as the underlying physical components are changed during operation of the virtual server. In some embodiments, the monitoring method 900 automatically accounts for and monitors new associated physical components (reflected in the lists of physical components 370) that are newly implemented by the virtual server, without requiring human initiation or intervention (e.g., to re-configure the monitoring method 900 to begin monitoring the new associated physical components).

In some embodiments, the monitoring method 900 is performed at predetermined time intervals so that the health logs regarding the predetermined health issues stored in the health database 340 are updated regularly and the health database 340 contains current health logs. When the situation or condition of a predetermined health issue changes (e.g., the predetermined health issue is resolved), the new information relating to the predetermined health issue is used to modify the health database 340.

FIG. 10 shows a flowchart of operations of a reporting function. In some embodiments, some of the steps of the reporting method 1000 are implemented by software or hardware. In some embodiments, some of the steps of method 1000 are performed by a set of health modules 330 executing on a set of server systems 110 implemented by the virtual server 180. In some embodiments, some steps of the method 1000 are performed automatically without human initiation, interaction, or intervention. The order and number of steps of the method 1000 are for illustrative purposes only and, in other embodiments, a different order and/or number of steps are used. The reporting method 1000 may be initiated by administrative command or upon occurrence of a predetermine time interval. In some embodiments, the reporting method 1000 is performed at predetermined time intervals for health maintenance or is performed upon administrative command for problem solving (for example, when a problem with the performance or function of the virtual server is encountered).

The reporting method 1000 begins by retrieving (at 1001) health logs 601 from one or more health databases 340 (e.g., stored at one or more server systems 110 used by a virtual server 180). The health-logs 601 may comprise information regarding predetermined health issues, including configuration health issues, virtual component health issues, and physical component health issues of the virtual server 180. The method 1000 then processes and analyzes (at 1005) the collected health logs 601 to produce a summary report that summarizes overall health issues concerning the virtual server 180 (including a summary of issues relating to configuration settings, virtual components, and/or physical components of the virtual server 180).

The method 1000 processes and analyzes (at 1010) the collected health logs 601 to produce a topic report that summarizes health issues relating to configuration/protocol settings. The method 1000 processes and analyzes (at 1015) the collected health logs 601 to produce a topic report that summarizes health issues relating to one or more virtual components. The method 1000 processes and analyzes (at 1020) the collected health logs 601 to produce a topic report that summarizes health issues relating to one or more physical components. In some embodiments, the health reports (produced in steps 1005 through 1020) may only contain information regarding open predetermined health issues that are currently unresolved.

The method then determines (at 1030) whether an activation trigger for performing the reporting function is received. For example, the activation trigger may comprise receiving an administrative command to perform the reporting function or may comprise the occurrence of a predetermine time interval. If the activation trigger is not received (at 1030—No), the method continues at 1030. If the activation trigger is received (at 1030—Yes), the method continues at step 1001 where it retrieves health logs 601 from one or more health databases 340. In some embodiments, the reporting method 1000 is performed at predetermined time intervals for health maintenance or is performed upon administrative command for problem solving (for example, when a problem with the performance or function of the virtual server is encountered).

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A system for monitoring health issues of a virtual server, the system comprising:
    a set of two or more server systems, each server system configured for providing data-access service to a storage system for one or more client systems;
    the storage system for storing data;
    the virtual server comprising a plurality of virtual-server components for collectively providing data-access service for the client systems, the virtual-server components comprising:
        a plurality of physical components distributed over the set of two or more server systems and the storage system; and
        a plurality of virtual components distributed over the set of two or more server systems and the storage system, a virtual component configured for having a current associated physical component in the set of server systems or the storage system and transparently changing association to a new associated physical component in the set of server systems or the storage system, wherein data-access service to a client system is uninterrupted during the change of association, the virtual components including at least one virtual volume in the storage system; and
    a set of health modules, each health module residing on a server system, the set of health modules configured for:
        collectively monitoring a set of predetermined health issues regarding the functions or performance of the virtual-server components, wherein a virtual volume is configured for having a current associated aggregate in the storage system and transparently changing association to a new associated aggregate in the storage system, and the set of health modules automatically monitor the set of predetermined health issues regarding the functions or performance of the new associated aggregate in the storage system.

2. The system of claim 1, wherein a virtual component has a unique identifier within the virtual server that is used by a client system in accessing the virtual server, wherein the unique identifier of the virtual component does not change during a change of association to a new associated physical component.

3. The system of claim 1, wherein a virtual component comprises a virtual interface for providing a network connection between the virtual server and a client system, the virtual interface configured for having a current associated network port in the set of server systems and transparently changing association to a new associated network port in the set of server systems.

4. The system of claim 1, wherein each server system is further configured for:
- offsetting a server system failure in the set of servers systems; and
- distributing data-access loads from the client systems within the set of servers systems.

5. The system of claim 1, wherein the set of health modules is further configured for:
- producing a health report, a health report comprising a summary report summarizing health issues regarding the virtual server or a topic report summarizing configuration health issues, virtual component health issues, or physical component health issues of the virtual server.

6. The system of claim 1, wherein:
- the storage system comprises a plurality of storage devices for storing data;
- an aggregate comprises at least one storage device of the storage system; and
- a virtual component comprising a virtual volume in the storage system has an associated aggregate in the storage system.

7. The system of claim 1, wherein:
- an aggregate provides an aggregate storage space, each virtual volume comprising a sub-set of the aggregate storage space; and
- a virtual volume dynamically increases or decreases in storage size within the aggregate storage space.

8. The system of claim 1, wherein:
- the virtual components comprise a plurality of virtual volumes on the storage system;
- the plurality of virtual volumes comprise a global namespace, each virtual volume comprising a sub-set of the global namespace; and
- the global namespace comprises a single shared file system accessible by all server systems in the set of server systems.

9. A system for monitoring health issues of a virtual server, the system comprising:
- a set of at least two server systems, each server system configured for providing data-access service to one or more client systems;
- the virtual server comprising a plurality of virtual-server components comprising virtual components and physical components distributed over the set of at least two server systems, each virtual component having an associated physical component in the set of at least two server systems, the virtual-server components being used by the virtual server for collectively providing data-access service to the client systems; and
- a set of health modules, each health module residing on a server system, the set of health modules configured for collectively:
  - collecting information regarding a set of predetermined health issues regarding the functions or performance of the virtual server;
  - storing the collected information as health logs stored to a health database, each health log comprising information regarding a predetermined health issue for a particular virtual or physical component in the virtual server;
  - retrieving a plurality of health logs from the health databases; and
  - producing a health report that summarizes the plurality of retrieved health logs, the health report summarizing the set of predetermined health issues for virtual or physical components of the virtual server, the virtual or physical components of the virtual server being distributed over at least two different server systems.

10. The system of claim 9, wherein each server system is configured for providing data-access service for accessing a set of one or more storage systems, the system further comprising:
- the set of one or more storage systems for storing data, wherein the virtual server further comprises a plurality of virtual-server components distributed over the set of one or more storage systems.

11. The system of claim 9, wherein a virtual component is configured for having a current associated physical component in the set of server systems and transparently changing association to a new associated physical component in the set of server systems, wherein data-access service to a client system is uninterrupted during the change of association.

12. The system of claim 9, wherein upon a predetermined health issue changing in condition, new information collected for the changed predetermined health issue is used to modify a health database.

13. The system of claim 9, wherein each health module comprises a parameter interface for receiving configuration parameters to dynamically change the set of predetermined health issues without requiring software code of the health module to be modified.

14. The system of claim 9, wherein a health report only contains information regarding open predetermined health issues that are currently unresolved on the virtual server.

15. The system of claim 9, wherein:
- the set of predetermined health issues comprises configuration health issues, virtual component health issues, and physical component health issues of the virtual server; and
- a health report comprises a summary of all health issues regarding the virtual server.

16. The system of claim 9, wherein:
- the set of predetermined health issues comprises configuration health issues, virtual component health issues, and physical component health issues of the virtual server; and
- a health report comprises a summary of only configuration health issues, only virtual component health issues, or only physical component health issues of the virtual server.

17. The system of claim 9, wherein each health module comprises a parameter interface for receiving configuration parameters to dynamically change specified contents to be contained in the health report without requiring software code of the health module to be modified.

18. The system of claim 9, wherein:
- the set of at least two server systems comprises at least first and second server system; and
- the plurality of retrieved health logs comprises at least first and second health logs, the first health log comprising information regarding a predetermined health issue for a virtual or physical component distributed on the first server system and the second health log comprising information regarding a predetermined health issue for a virtual or physical component distributed on the second server system.

19. A method for monitoring health issues of a virtual server, the method comprising:

providing a set of at least two server systems, the virtual server comprising a plurality of virtual-server components comprising virtual components and physical components distributed over the set of at least two server systems, each virtual component having an associated physical component in the set of at least two server systems, the virtual-server components being used by the virtual server for collectively providing data-access service to one or more client systems, each server system configured for collectively:

collecting information regarding a set of predetermined health issues regarding the functions or performance of the virtual server;

storing the collected information as health logs stored to a health database, each health log comprising information regarding a predetermined health issue for a particular virtual or physical component in the virtual server;

retrieving a plurality of health logs from the health databases; and producing a health report that summarizes the plurality of retrieved health logs, the health report summarizing the set of predetermined health issues for virtual or physical components of the virtual server, the virtual or physical components of the virtual server being distributed over at least two different server systems.

* * * * *